United States Patent
Fujii et al.

(10) Patent No.: US 7,508,306 B2
(45) Date of Patent: Mar. 24, 2009

(54) HANDHELD RFID READER WITH DISPLAY

(75) Inventors: Hiroshi Fujii, Kyoto (JP); Takafumi Kimura, Kyoto (JP)

(73) Assignee: Omron Corporation, Kyoto (JP)

( * ) Notice: Subject to any disclaimer, the term of this patent is extended or adjusted under 35 U.S.C. 154(b) by 326 days.

(21) Appl. No.: 11/589,927

(22) Filed: Oct. 31, 2006

(65) Prior Publication Data

US 2007/0109128 A1    May 17, 2007

(30) Foreign Application Priority Data

Jul. 11, 2005   (JP)   ............................. 2005-322073

(51) Int. Cl.
  *G08B 13/14* (2006.01)
(52) U.S. Cl. .................... 340/572.1; 340/10.1; 235/375
(58) Field of Classification Search ............... 340/572.1
  See application file for complete search history.

(56) References Cited

U.S. PATENT DOCUMENTS 6,616,037 B2 *   9/2003   Grimm et al. ................ 235/385
2003/0034387 A1 *  2/2003   Knowles et al. .............. 235/375
2003/0034392 A1 *  2/2003   Grimm et al. ................ 235/385
2005/0162274 A1 *  7/2005   Shniberg et al. .......... 340/572.1
2005/0206729 A1 *  9/2005   Chang et al. ................. 348/155
2005/0226489 A1 * 10/2005   Beach et al. ................. 382/141

FOREIGN PATENT DOCUMENTS

JP       A 2000-148156       5/2000

* cited by examiner

*Primary Examiner*—George A Bugg
(74) *Attorney, Agent, or Firm*—Dickstein Shapiro LLP (57) ABSTRACT

A handy terminal allowing an object of interest such as a cargo to be efficiently searched utilizing an RFID tag is provided. A detection unit detects the distance and direction of an RFID tag attached to an object of search from a point for observing the distance and direction. A reading unit reads information on the external shape of the object of search written in a memory portion of the RFID tag. An image processing unit displays a three-dimensional graphic of the disposition of the RFID tag based on the distance and direction detected by the detection unit and compositely displaying a three-dimensional appearance image of the object of search estimated from the external shape information of the object of search read by the reading unit in the position where the three-dimensional graphic of the RFID tag is displayed.

8 Claims, 6 Drawing Sheets

HANDHELD RFID READER WITH DISPLAY

BACKGROUND OF THE INVENTION

1. Field of the Invention

The present invention relates to a handy terminal which allows an object of search such as a cargo to be efficiently searched using an RFID tag.

2. Description of the Related Art

Physical distribution is one of fields in which RFID tags are frequently used. In the same field, RFID tags are used as follows. For example, an RFID tag is attached to a cargo to be delivered, and the contents of the cargo are written in a memory portion of the RFID tag. When it is required to know the contents of the cargo on a site of physical distribution, the contents of the cargo are displayed by reading them from the RFID tag attached to the cargo with a handy terminal incorporating a tag reader.

However, the above-described method of using RFID tags only allows the contents of each cargo to be displayed on a handy terminal. For example, when a particular cargo is to be searched from among a plurality of cargos temporarily stored in a distribution warehouse, the position of the particular cargo in the warehouse cannot be identified. A problem therefore arises in that a search for a cargo cannot be efficient and takes much time and labor.

For example, technique utilizing RFID tags include the technique disclosed in Patent Document 1. However, the technique disclosed in Patent Document 1 only utilizes an RFID tag 30 attached to an instruction manual 13 for a digital camera 12 to read information on entries set in the instruction manual 13. The technique does not allow the position of an object, e.g., the instruction manual 13, to be identified. Therefore, when the technique disclosed in the document is used for searching an object, the object of search cannot be efficiently searched.

Patent Document 1: JP-A-2000-148156

The invention is made to solve the above-described problem, and it is an object of the invention to provide a handy terminal which allows an object of search such as a cargo to be efficiently searched using an RFID tag.

SUMMARY OF THE INVENTION

In order to solve the above-described problem, the invention is characterized in that it provides a detection unit for detecting the distance and direction of an RFID tag attached to an object of search from a point of observation, a reading unit for reading attribute information including at least information on the external shape of the object of search written in a memory portion of the RFID tag, and an image processing unit for displaying the RFID tag in a three-dimensional graphic of the disposition of the RFID tag based on the distance and direction detected by the detection unit and compositely displaying a three-dimensional graphic of the appearance of the object of search estimated from the external shape information of the object of search read by the reading unit in the position where the three-dimensional graphic of the RFID tag is displayed.

The term "three-dimensional graphic" means an image or picture of a three-dimensional entity such as a space or solid projected and rendered on a computer screen according to a definition in e-Words (http://e-words.jp) which is a glossary of information and telecommunication technologies.

The object of search may be a cargo under physical distribution, and the term is to be understood as representing a broad concept implying also human-beings, plants and animals. In the case of cargos, the invention is advantageous in that it provides measures to allow a cargo of interest to be searched efficiently. When the object of search is a human-being, the invention may be used in the manner described below.

When the collapse of a building or landside occurs, it is difficult to make the identification of victims on the scene in not a few cases. If victims have RFID tags attached to themselves in such a case, the invention may be advantageously used as powerful measures to eliminate the difficulty of identification. Specifically, provided that the reading unit according to the invention can read information written in the memory portions of the RFID tags on the scene as described above, three-dimensional graphics of the positions of the RFID tags of the victims are displayed, and three-dimensional graphics of the shapes (external appearances) of the victims (which are estimated from information on the external shapes of the victims read from the RFID tags) are compositely displayed in the positions where the three-dimensional graphics of the tags are displayed. It is therefore possible to acquire information on the location of victims, e.g., information on where and how many victims exist, in a stereoscopic and realistic manner, and the operation of identifying victims is facilitated.

The reading unit may be configured to transmit a main carrier toward an RFID tag as described above and to read the external shape information of the object of search from a sub-carrier transmitted from the RFID tag in response to the main carrier.

The detection unit may be configured to detect the distance and direction of the tag based on the sub-carrier transmitted from the RFID tag.

Referring to the method of detecting the distance of the RFID tag based on the sub-carrier transmitted from the RFID tag, the method disclosed in European Unexamined Patent No. EP1239634A2 or a method utilizing a difference between the phases of the main carrier and the sub-carrier may be employed.

Referring to the method of detecting the direction of the RFID tag based on the sub-carrier transmitted from the RFID tag, various methods may be employed including, for example, the beam former method known as the most basic technique, the capon method known as providing higher resolving performance than the beam former method, the maximum entropy method and other methods of linear prediction, the min-norm method, MUSIC, and ESPRIT. Known documents on such methods include, for example, *Adaptive Antenna Techniques*, Nobuyoshi Kikuma, Ohmsha, Ltd. Known representative technical papers on such methods include, for example, *The Estimation of DOA and Propagation Delay Time of Multipath Waves for Indoor Radio Communication: Shingakuron (IEICE Transactions on Communications (B-II)* vol. J73-B-II, No. 11, pp. 786-795 (November 1990).

The external shape information of an object of search is information for identifying the external shape of the object of search, and the information may include, for example, the name and dimensions of the shape of the object of search.

The handy terminal according to the invention may have the following additional features.

An ID for the object of search to which the RFID tag is attached may be additionally written in the memory portion of the RFID tag, and the information read by the reading unit includes the ID. The handy terminal may further include a search assisting unit. The search assisting unit includes an input part for inputting the ID as a retrieval key and a retrieval/instruction part for retrieving the information read by the reading unit using the ID input with the input part as a retrieval key and instructing the image processing unit to highlight the three-dimensional graphic of the external appearance of the object of search specified by the ID used as a retrieval key when the retrieval key is included in the information.

Information on the contents of the object of search to which the RFID tag is attached may be also written in the memory portion of the RFID tag. The information read by the reading unit may include the contents information. The handy terminal may further include a search assisting unit. The search assisting unit includes an input part for inputting the contents in formation as a retrieval key and retrieval/instruction part for retrieving the information read by the reading unit using the contents information input with the input part as a retrieval key and instructing the image processing unit to highlight the three-dimensional graphic of the external appearance of the object of search identified by the contents information used as a retrieval key when the retrieval key is included in the information.

An example of highlighting is to highlight (blink) only the three-dimensional graphic of the external appearance of the object of search specified by the ID used as a retrieval key. Alternatively, only the three-dimensional graphic representing the external appearance of the object of search may be displayed in a display color different from those of three-dimensional graphics representing the external appearance of other objects of search.

According to the invention, the use of the above-described configuration allows the position of an RFID tag actually attached to an object of search such as a cargo to be displayed in the form of a three-dimensional graphic, and a three-dimensional graphic representing the external appearance of the object of search is compositely displayed in the position where the three-dimensional graphic of the tag is displayed. It is therefore possible to acquire information such as the shape and position of an object of search such as a cargo in a stereoscopic and realistic way, which is advantageous in that an object of interest such as a cargo can be conveniently searched.

DESCRIPTION OF THE PREFERRED EMBODIMENT

A preferred embodiment of the invention will now be described in detail with reference to the accompanying drawings.

Figure 1:
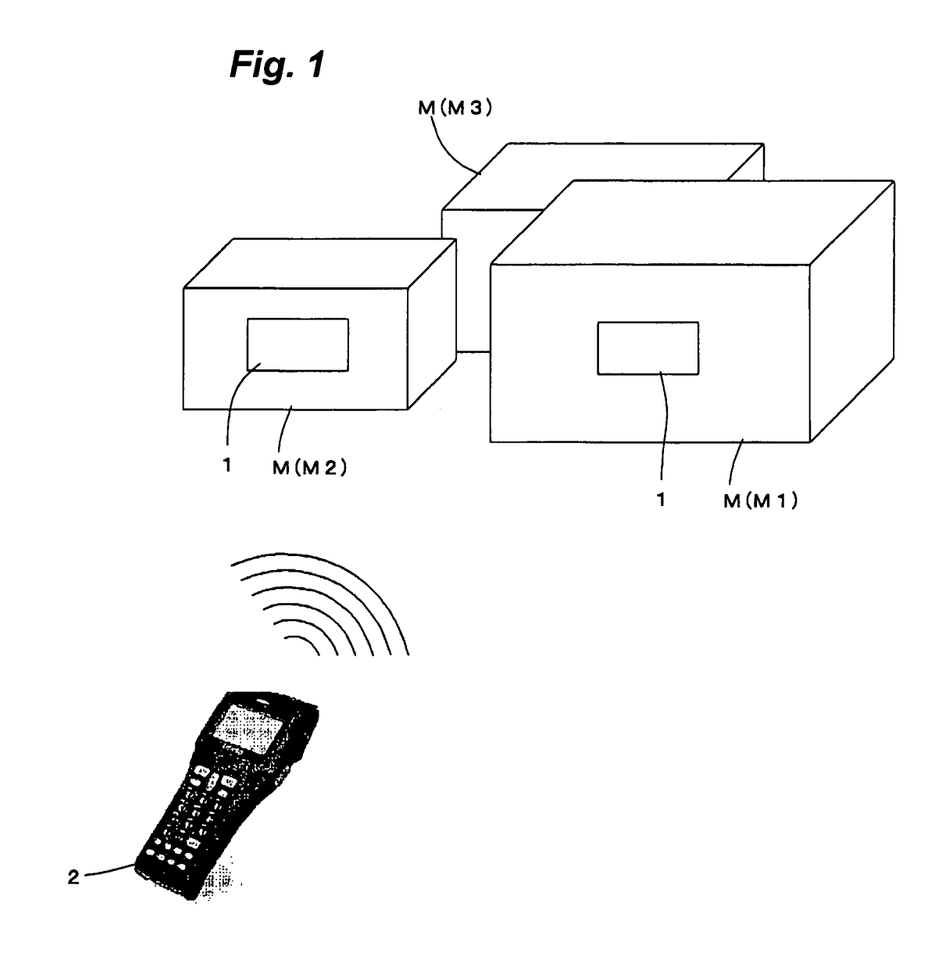
FIG. 1 illustrates the external appearance of a handy terminal employing the invention and an example of the use of the same.
Figure 2:
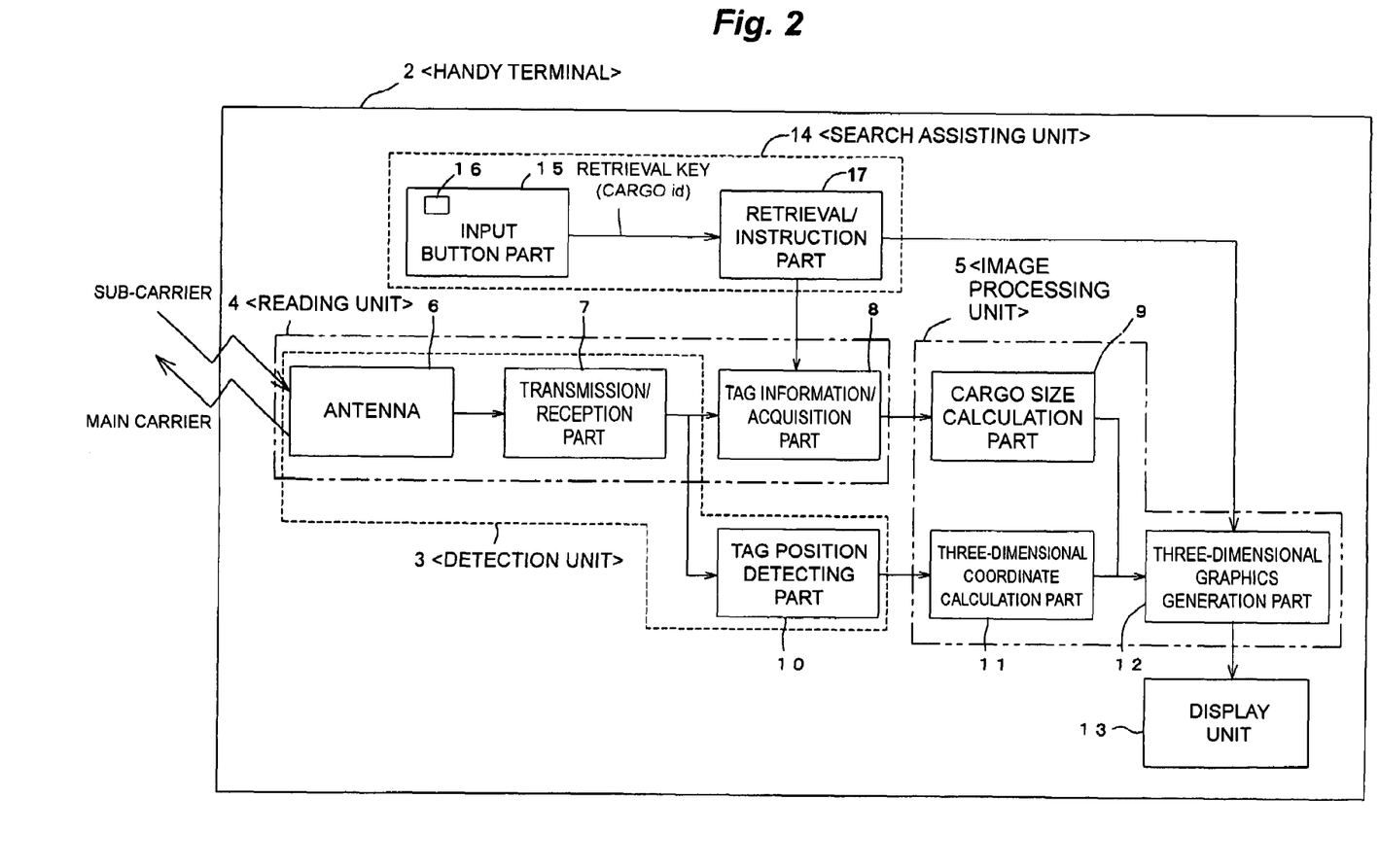
FIG. 2 is a functional block diagram of the handy terminal.
Figure 3:
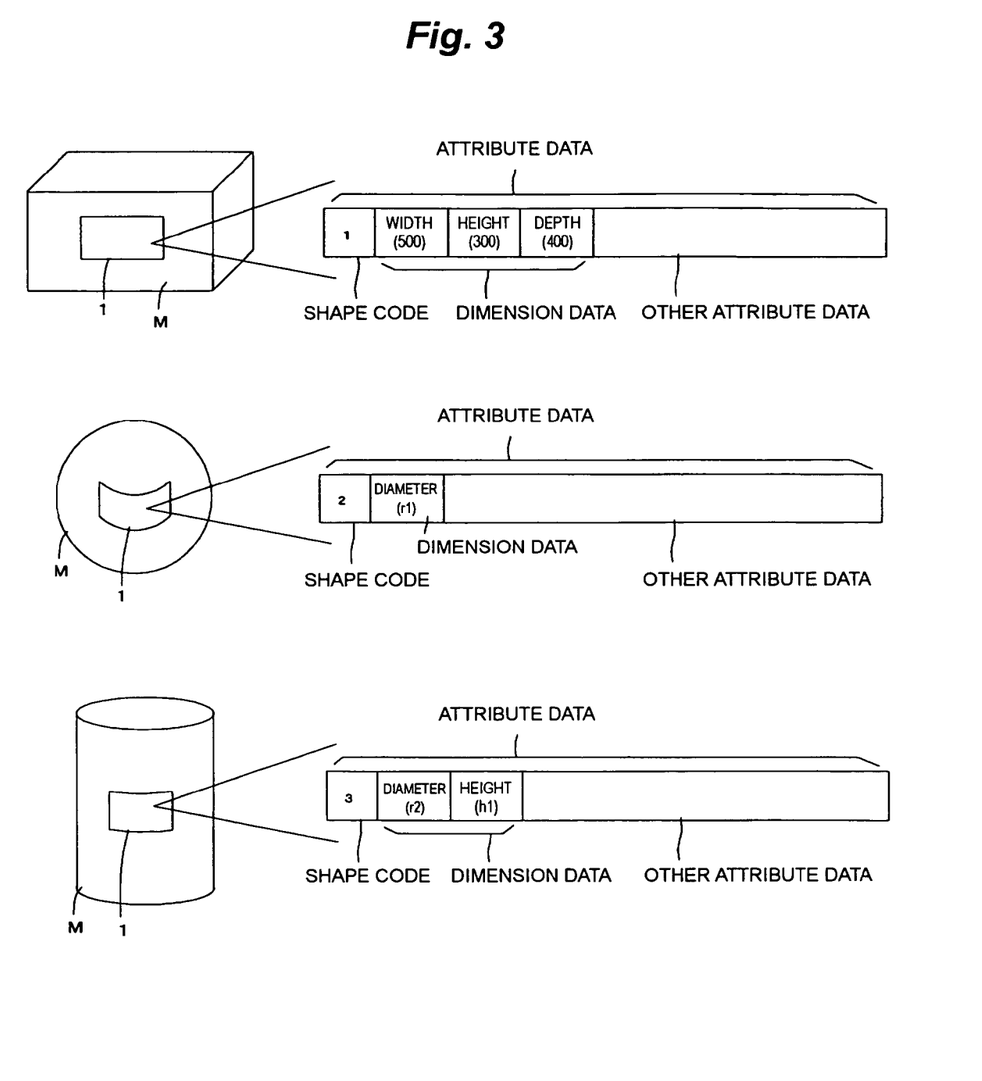
FIG. 3 illustrates attribute information of cargos which is readably recorded in RFID tags.
Figure 4A:
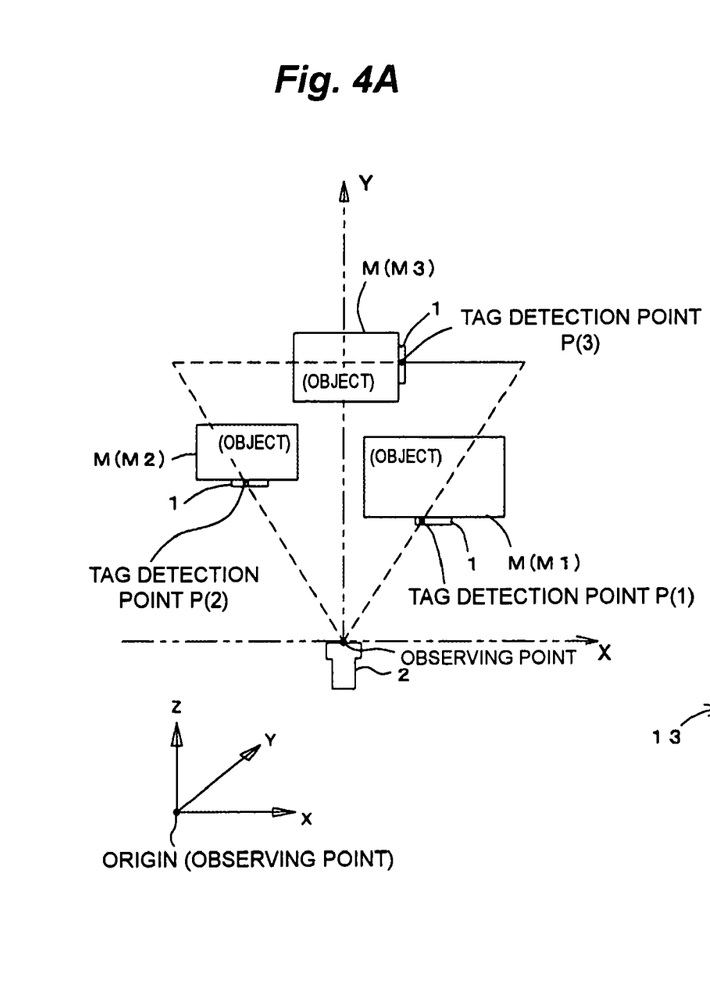
FIG. 4A illustrates the RFID tags and cargos on the actual coordinates of a three-dimensional space.
Figure 4B:
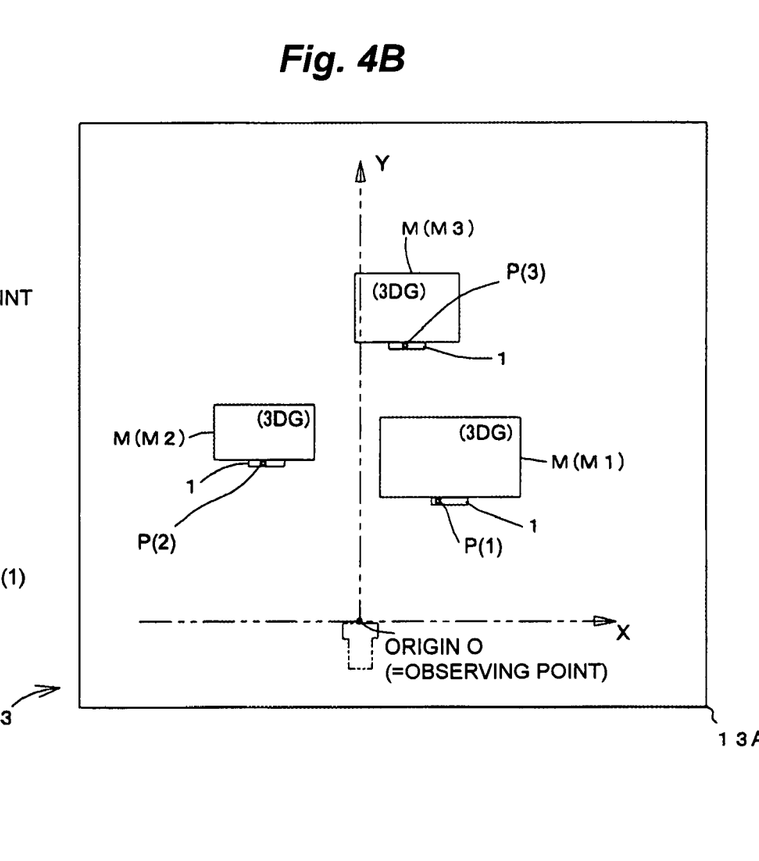
FIG. 4B illustrates an example of a three-dimensional graphic representation of the RFID tags and cargos disposed as shown in FIG. 4A.
Figure 5:
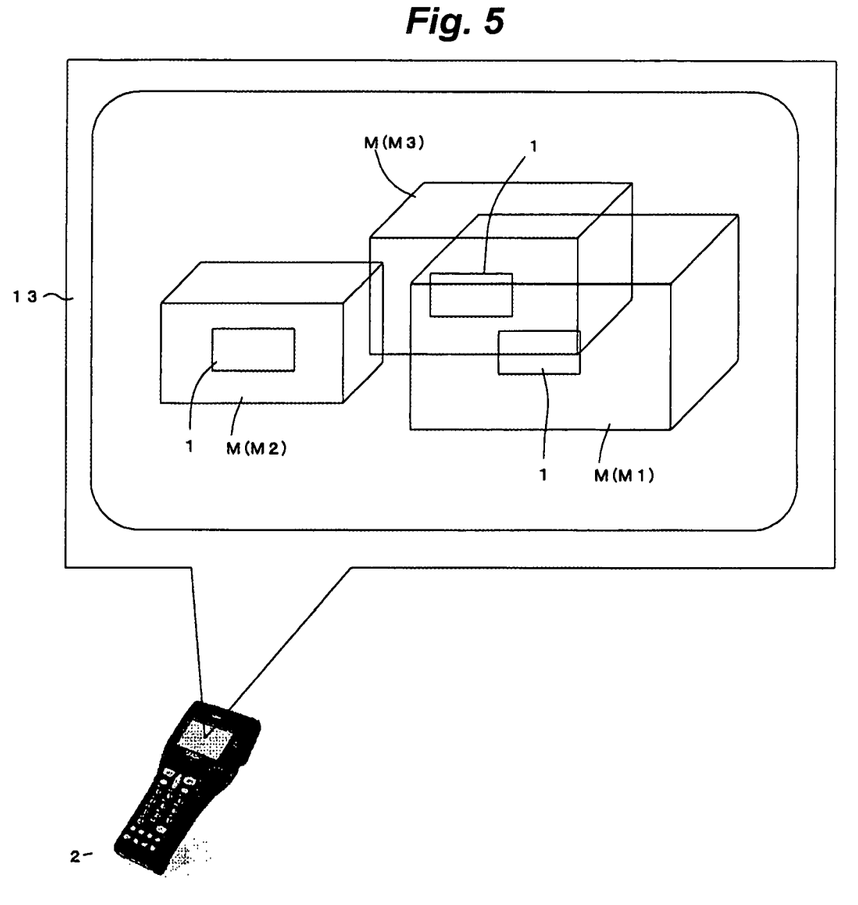
FIG. 5 illustrates an example of a three-dimensional graphic representation.
Figure 6:
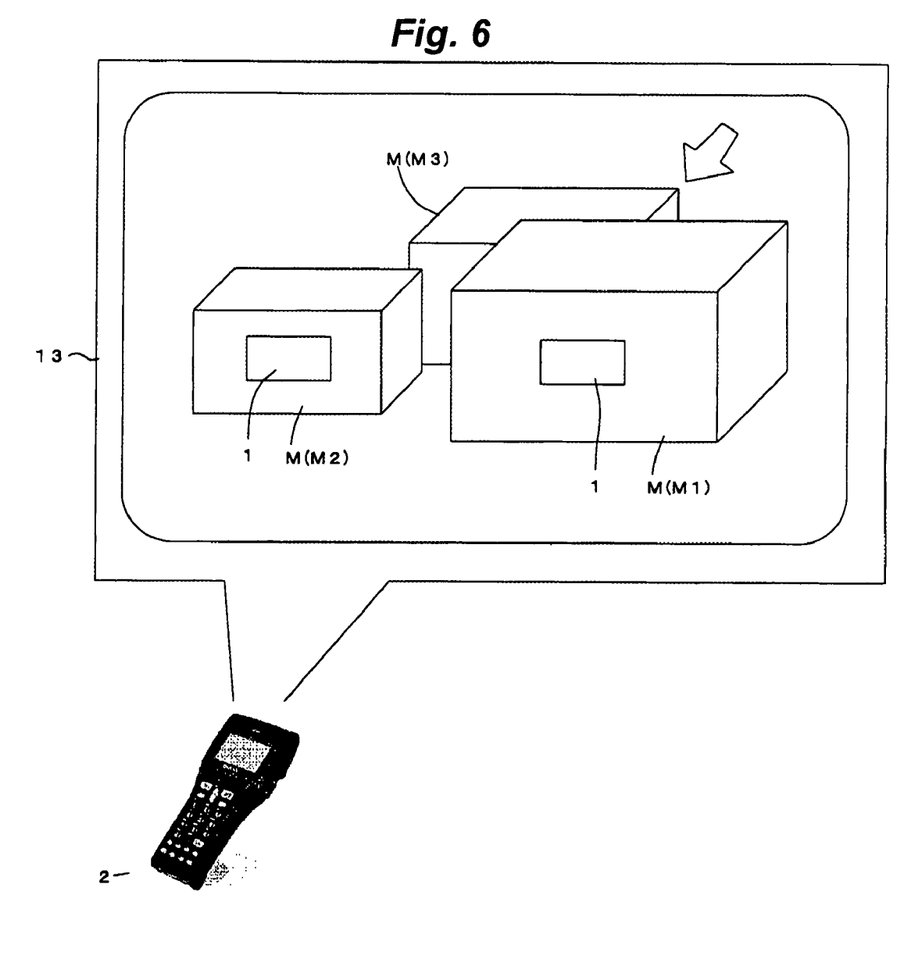
FIG. 6 illustrates another example of a three-dimensional graphic representation.

FIG. 1 illustrates the external appearance of a handy terminal employing the invention and an example of the use of the same. FIG. 2 is a functional block diagram of the handy terminal. FIG. 3 illustrates attribute information of cargos which is readably recorded in RFID tags. FIG. 4A illustrates the RFID tags and cargos on the coordinates of a three-dimensional space. FIG. 4B illustrates an example of a three-dimensional graphic representation of the RFID tags and cargos disposed as shown in FIG. 4A. FIG. 5 illustrates an example of a three-dimensional graphic representation. FIG. 6 illustrates another example of a three-dimensional graphic representation.

In the present embodiment, cargos M are objects to be searched. An RFID tag 1 is attached to each cargo M, and the RFID tag 1 transmits information on the attributes of the cargo M in response to an electric wave transmitted from a handy terminal 2 (hereinafter referred to as "main carrier"). The attribute information of the cargo M is registered in advance in a non-volatile memory serving as a memory portion (not shown) of the RFID tag 1. When the attribute information is transmitted, the attribute information of the cargo M is read from the non-volatile memory and modulated in the RFID tag 1, and the modulated wave (hereinafter referred to as "sub-carrier") is transmitted from an antenna (not shown) incorporated in the RFID tag 1.

"The attribute information of a cargo M" is data representing the characteristics or nature of the cargo M, and the information includes an ID assigned to the cargo M (hereinafter referred to as "cargo ID") and information on the external shape of the cargo M to which the RFID tag 1 is attached. The external shape information of a cargo M used in the present embodiment is a code identifying the external shape of the cargo M (hereinafter referred to as "external shape code") and dimension data identifying the size of the cargo M. The attribute information of the cargo may further include information on the contents of the cargo M, e.g., the type of the cargo such as soybean paste or soy source and the quantity and the best-before-period of the same, information on the shipper, e.g., the name, residence, and address of the shipper, and information on the destination, e.g., a code for the destination or the distributor's branch at the destination. Those pieces of information are also registered in the memory portion of the RFID tag 1 as attribute information of the cargo M.

The "external shape code" may take various forms. Although the present embodiment employs codes "1", "2", and "3" to represent a square cylinder, a sphere, and a circular cylinder, respectively, as examples of such a shape code as will be understood from FIG. 3, other codes may be used.

The "dimension-data" depends on the shape of the cargo M. For example, when the code "1" for a square cylinder is recorded in the RFID tag 1, three items of dimension data, i.e., "width, height, and depth" are recorded in the RFID tag 1 along with the code "1". When the code "2" for a sphere is recorded in the RFID tag 1, one item of dimension data, i.e., "diameter" is recorded in the RFID tag 1 along with the code "2". When the code "3" for a circular cylinder is recorded in the RFID tag 1, two items of dimension data, i.e., "base diameter and height" are recorded in the RFID tag 1 along with the code "3".

The handy terminal 2 shown in FIG. 1 has the functions of a detection unit 3, a reading unit 4, and an image processing unit 5 as shown in FIG. 2. The detection unit 3 is a unit for detecting the distance and direction of an RFID tag 1 attached to a cargo M from an observing point (see FIG. 4A). The reading unit 4 is a unit for reading the attribute information of the cargo M such as the external shape information written in the memory portion of the RFID tag 1. The image processing unit 5 is a unit for displaying the disposition of the RFID tag 1 in the form of a three-dimensional graphic (3D CG) of the RFID tag 1 based on the distance and direction detected by the detection unit 3 and compositely displaying a three-dimensional graphic of the external appearance of the cargo M estimated from the external shape information of the cargo M read by the reading unit 4 in the position where the three-dimensional graphic of the RFID tag 1 is displayed.

In order to allow those units to demonstrate their functions, the handy terminal 2 in FIG. 1 includes an antenna 6, a transmission/reception part 7, a tag information acquisition part 8, a cargo size calculation part 9, a tag position detecting part 10, a three-dimensional graphics coordinate calculation portion 11, a three-dimensional graphics generation part 12, and a display unit 13, as shown in FIG. 2.

The transmission/reception part 7 transmits a main carrier through the antenna 6. When a sub-carrier is transmitted from an RFID tag 1 in response to the main carrier, this part receives the sub-carrier through the antenna 6.

The tag information acquisition part 8 demodulates the sub-carrier received by the transmission/reception part 7 to acquire the attribute information of the cargo M from the sub-carrier, i.e., the cargo ID, the shape information (the shape code and dimension data) and the contents information of the cargo. The shape and the size of the cargo M are also identified based on the shape code and dimension code included in the attribute information as shape information. Such processes are performed on each of the cargos M (M1, M2, and M3).

For example, when the tag information acquisition part 8 acquires a shape code "1" and dimension data "500, 300, 400", the shape of the cargo is dentified as a square cylinder having actual dimensions of 500 mm (width)×300 mm (height)×400 mm (depth). When a shape code "2" and dimension data "r1" are acquired, the shape of the cargo is identified as a sphere having an actual diameter r1. When a shape code "3" and dimension data "r2, h1" are acquired, the shape of the cargo is identified as a circular cylinder having an actual base diameter r2 and an actual height h1.

The cargo size calculation part 9 calculates the size of a cargo M (hereinafter referred to as "size data of a cargo M") from the actual size of the cargo M identified as described above, the external appearance of the cargo M being displayed in that size in the form of a three-dimensional graphic. This process is also performed on each of the cargos M (M1, M2, and M3).

The tag position detecting part 10 detects the distance and direction of an RFID tag 1 attached to a cargo M from a point for observing the distance and direction based on the sub-carrier from the RFID tag 1 received by the transmission/reception part 7. This process is also performed on each of the cargos M (M1, M2, and M3). The point for observing of the distance and direction is the point where the handy terminal 2 exists.

Referring to the method of detecting the distance (hereinafter referred to as "RFID tag distance"), for example, the method disclosed in European Unexamined Patent No. EP1239634A2 or a method utilizing a difference between the phases of the main carrier and the sub-carrier may be employed.

Referring to the method of detecting the direction (hereinafter referred to as "RFID tag direction"), various methods may be employed including the beam former method known as the most basic technique, the capon method known as providing higher resolving performance than the beam former method, the maximum entropy method and other methods of linear prediction, the min-norm method, MUSIC, and ESPRIT.

As shown in FIG. 4A, the three-dimensional coordinate calculation part 11 calculates coordinate values of an RFID tag 1 from the distance and direction of the RFID tag 1 identified using the above-cited methods using X, Y, and Z three-dimensional spatial coordinates whose origin O is the point for observing the distance and direction of the RFID tag 1 (the point where the handy terminal 2 exists). This process is also performed on each of the cargos M (M1, M2, and M3). The coordinate values of the RFID tag 1 are on the three-dimensional spatial coordinates, and they are the coordinate values of tag detection points indicated by P(1), P(2), and P(3) in the case shown in FIG. 4A.

The three-dimensional graphics generation part 12 performs a process (1) of calculating the display position of an RFID tag 1 on a display screen 13A of the display unit 13 from the coordinate values and displaying a three dimensional graphic of the RFID tag in the display position and a process (2) of generating a three-dimensional graphic of the external appearance of the cargo M of interest from the shape of the cargo identified by the tag information acquisition part 8 and the size data of the cargo M calculated by the cargo size calculation part 9 and compositely displaying the three-dimensional graphic of the external appearance of the cargo M in the position where the three-dimensional graphic of the RFID tag 1 is displayed. Those processes are also performed on each of the cargos M (M1, M2, and M3). The three-dimensional graphic of the external appearance of the RFID tag 1 displayed on the display screen 13A may be generated by the three-dimensional graphics generation part 12 like the three-dimensional graphic of the external appearance of the cargo M. Such a three-dimensional graphic may alternatively be registered in advance in a memory portion (not shown) of the handy terminal 2 and may be read out to be used by the thee-dimensional graphics generation part.

As a result of the above-described processes at the three-dimensional graphics generation part 12, a positional relationship between a plurality of RFID tags 1 is displayed on the display unit 13 in the form of three-dimensional graphics of the RFID tags 1 as shown in FIG. 5 or 6. The three-dimensional graphics of the external appearance of the cargos M1, M2, and M3 to which the RFID tags are attached are compositely and stereoscopically displayed in the positions where the three-dimensional graphics of the respective RFID tags 1 are displayed. In such a stereoscopic three-dimensional graphic composite image, the cargos M and the RFID tags 1 may be described in the form of wire frames as shown in FIG. 5. Alternatively, hidden-line processing may be performed as shown in FIG. 6 to describe a cargo M located behind another cargo such that it is obscured by the cargo in front of the same. When a cargo is invisible or difficult to see by being thus obscured, an arrow pointing the cargo is preferably displayed (see the arrow in FIG. 6) to clearly indicate that a cargo is hidden in the position pointed by the arrow.

When the tag information acquisition part 8 has acquired the contents information of a cargo M, the contents information of the cargo M is also display in the neighborhood of the three-dimensional appearance image of the cargo M, although not shown.

As shown in FIG. 2, the handy terminal 2 in FIG. 1 further includes a search assisting unit 14 which assists an operator in searching a cargo of interest easily. The search assisting unit 14 is configured as follows.

When a retrieval button 16 of an input button part 15 (input part) provided on the handy terminal 2 is depressed and, for example, the cargo ID of the cargo M of interest is input through the input button part 15 of the handy terminal 2, the cargo ID is sent to a retrieval/instruction part 17 as a retrieval key.

Upon receipt of the retrieval key (which is a cargo ID in this example), the retrieval/instruction part 17 retrieves the information read by the reading unit 4 that is the attribute information acquired by the tag information acquisition part 8 using the retrieval key. When the retrieval key is included in the attribute information, the part 17 instructs the three-dimensional graphics generation part 12 to highlight the three-dimensional appearance image of the cargo specified by the cargo ID used as a retrieval key. Instead of a cargo ID, the contents information of a cargo M, e.g., the type of the cargo such as soybean paste or soy source and the quantity and the best-before-period of the same may be used as a retrieval key. For example, when a best-before-period is used as a retrieval key, it is instructed to highlight the three-dimensional graphic of the external appearance of the cargo identified by the best-before-period.

The highlighting may be performed in various exemplary ways. An example of highlighting is to highlight (blink) only the three-dimensional graphic of the external appearance of a cargo specified by a cargo ID used as a retrieval key. Alternatively, only the three-dimensional graphic representing the external appearance of the cargo may be displayed in a display color different from those of three-dimensional graphics representing the external appearance of other cargos.

For example, the handy terminal 2 having the above-described configuration can be used as efficient measures to search a cargo M (M1, M2 or M3) of interest in a warehouse.

In the above-described example of use in which an RFID tag 1 is attached to each of the cargos M1, M2, and M3 in the warehouse as a prerequisite, the antenna 6 of the handy terminal 2 is directed toward the location of the cargos M and a search start button, which is not shown, on the handy terminal 2 is depressed.

Then, the functions of the handy terminal 2 (the functions of the detection unit 3, the reading unit 4, and the image processing unit 5) are activated by the press on the search start button serving as a trigger. As shown in FIG. 5 or 6, the positional relationship between the plurality of RFID tags 1 is displayed in the form of three-dimensional graphics of the RFID tags 1 on the display unit 13 of the handy terminal 2, and three-dimensional appearance images of the cargo M1, M2, and M3 having the RFID tags 1 attached thereon are compositely and stereoscopically displayed in the positions where the three-dimensional graphics of the respective RFID tags 1 are displayed. When the search assisting unit 14 of the handy terminal 2 is used, the three-dimensional appearance image of the cargo of interest M1, M2 or M3 is highlighted. For example, when a cargo ID is used as a retrieval key to perform retrieval as in the above-described example, the three-dimensional graphic of the external appearance of the cargo specified by the cargo ID is highlighted. When a cargo M is retrieved using the contents information of the same, e.g., the type of the cargo such as soybean paste or soy source, the quantity or the best-before-period as a retrieval key, the three-dimensional graphic of the external appearance of the cargo identified by the contents information is highlighted. It is therefore possible to search a cargo of interest efficiently.

What is claimed is:

1. A handy terminal comprising:
   a detection unit for detecting the distance and direction of an RFID tag attached to an object of search from a point of observation;
   a reading unit for reading attribute information including at least information on the external shape of the object of search written in a memory portion of the RFID tag; and
   an image processing unit for displaying the RFID tag in a three-dimensional graphic of the disposition of the RFID tag based on the distance and direction detected by the detection unit and compositely displaying a three-dimensional graphic of the appearance of the object of search estimated from the external shape information of the object of search read by the reading unit in the position where the three-dimensional graphic of the RFID tag is displayed.

2. A handy terminal according to claim 1, wherein the object of search is a cargo under physical distribution.

3. A handy terminal according to claim 1, wherein the reading unit transmits a main carrier toward the RFID tag and reads the external shape information of the object of search from a sub-carrier transmitted from the RFID tag in response to the main carrier.

4. A handy terminal according to claim 1, wherein the detection unit detects the distance and direction of the RFID tag based on the sub-carrier transmitted from the tag.

5. A handy terminal according to claim 1, wherein the external shape information of the object of search includes the name and dimensions of the shape of the object of search.

6. A handy terminal according to claim 1, wherein:
   an ID for the object of search to which the RFID tag is attached is additionally written in the memory portion of the RFID tag; and
   the information read by the reading unit includes the ID, and
   the handy terminal further comprises a search assisting unit including:
   an input part for inputting the ID as a retrieval key; and
   a retrieval/instruction part for retrieving the information read by the reading unit using the ID input with the input part as a retrieval key and instructing the image processing unit to highlight the three-dimensional graphic of the external appearance of the object of search specified by the ID used as a retrieval key when the retrieval key is included in the information.

7. A handy terminal according to claim 1, wherein:
   information on the contents of the object of search to which the RFID tag is attached is written in the memory portion of the RFID tag; and
   the information read by the reading unit includes the contents information; and
   the handy terminal further comprises a search assisting unit including:
   an input part for inputting the contents information as a retrieval key; and
   a retrieval/instruction part for retrieving the information read by the reading unit using the contents information input with the input part as a retrieval key and instructing the image processing unit to highlight the three-dimensional graphic of the external appearance of the object of search identified by the contents information used as a retrieval key when the retrieval key is included in the information.

8. A handy terminal according to claim 6 or 7, wherein the highlighting is to highlight especially the three-dimensional graphic of the external appearance of the object of search specified by the ID used as a retrieval key or to display only the three-dimensional graphic representing the external appearance of the object of search in a display color different from those of three-dimensional graphics representing the external appearance of other objects of search.

* * * * *